Patented Oct. 6, 1931

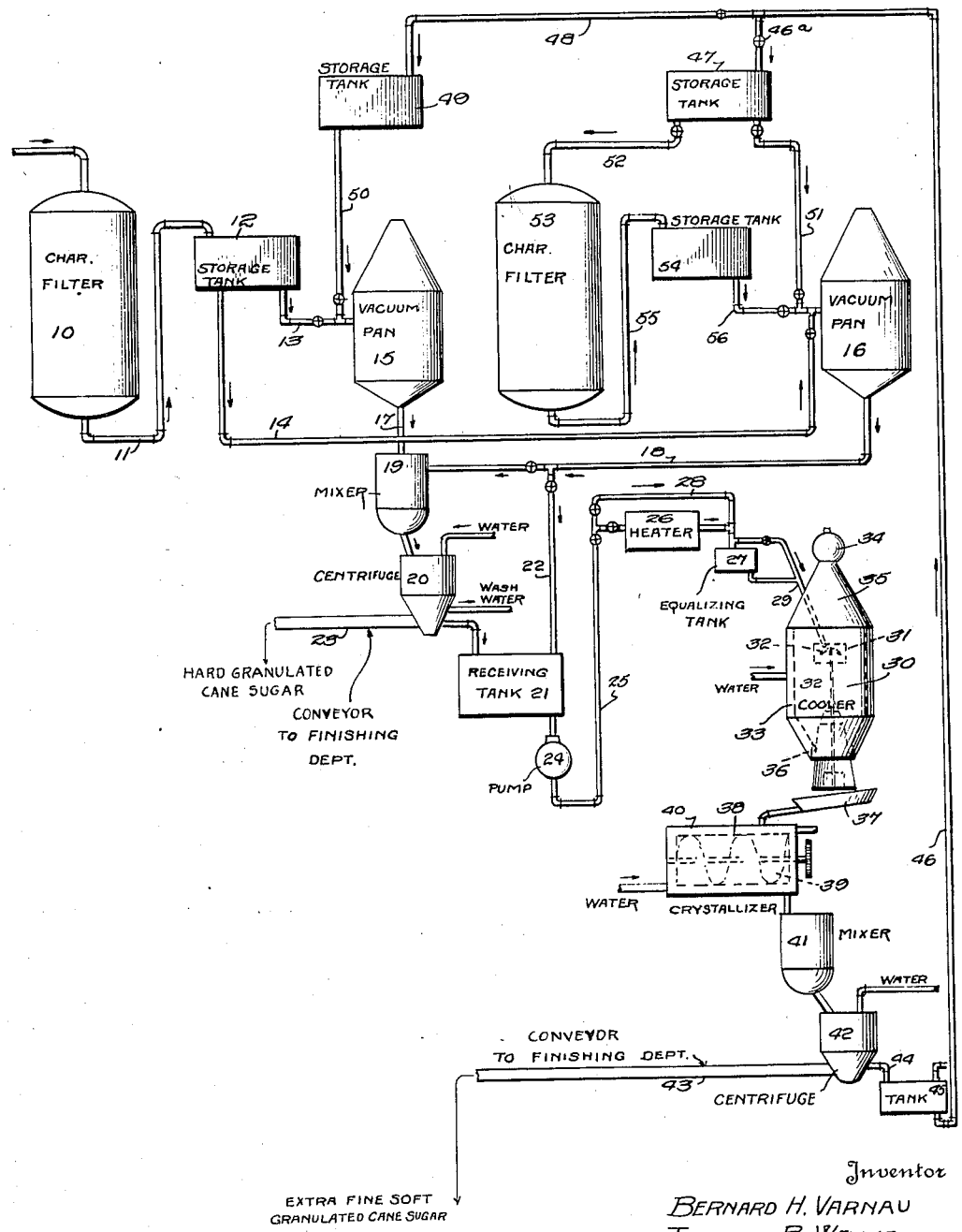

1,826,441

UNITED STATES PATENT OFFICE

BERNARD H. VARNAU AND TRUMAN B. WAYNE, OF SUGAR LAND, TEXAS

PROCESS FOR MANUFACTURE OF EXTRA FINE, SOFT GRANULATED CANE SUGAR

Application filed September 4, 1926. Serial No. 133,595.

This invention relates to the manufacture of cane sugar and more particularly to the manufacture of cane sugar or sucrose possessing crystals of extremely fine and soft characteristics from the granulated syrups derived in cane sugar refineries from the purging of hard granulated sugar massecuites, the sugar so produced being of nearly absolute purity (99 to 100 per cent.).

The principal object of this invention is to provide a process for handling these syrups in such a manner as to extract further yields of sugar without returning these syrups for reboiling in vacuum pans. In certain cases where the supply of these syrups is inadequate to supply production demands, they may be supplemented with high grade liquors from the refinery char filters.

The preferred method for the manufacture of the product of this invention is described and claimed in our copending application Serial No. 133,594, filed September 4, 1926, in which the process forming the subject matter of this application is also described but not claimed.

In the accompanying drawing we have illustrated in diagrammatic form a novel arrangement of apparatus which is preferably used in carrying out our process.

In this showing reference numeral 10 indicates a conventional refinery char filter which is connected by means of the pipe 11 to the storage tank 12. The storage tank 12 is connected by means of the pipes 13 and 14, to the vacuum pans 15 and 16, which latter are connected by pipes 17 and 18 to a mixer 19. The mixer 19 is connected to the centrifugal machine 20 which is in turn connected to the receiving tank 21. The vacuum pan 16 is also adapted to be connected to the receiving tank 21 by means of the pipe 22 communicating with the pipe 18. The centrifugal machine 20 is adapted to deliver the unfinished hard granulated cane sugar separated in the centrifugal machine 20 to the finishing department by means of the conveyor 23.

The receiving tank 21 is connected to a pump 24 which is connected by means of the pipe 25 to the heater 26 which is adapted to deliver its contents into the equalizing tank 27. If desirable the contents of the pipe 25 may be passed around the heater 26 through the pipe 28. From the equalizing tank the sugar solution is adapted to be introduced into the cooler 30 by means of the pipe 29. This cooler is preferably constructed with a centrifugal basket 31 having a scatter plate 32 mounted therein, and is provided with a water jacket 33. A draught of air may be drawn upwardly through the cooler by means of a fan 34 mounted on the hood 35. In the bottom of the cooler 30 are openings 36 adapted to deliver the contents from the cooler into a trough 37 which is connected to the crystallizer 38. The crystallizer 38 is provided with agitating means 39 and is surrounded by a water jacket 40. Connected with the crystallizer 38 is a mixer 41 and a centrifugal machine 42. From the centrifugal machine 42 the extra fine, soft, granulated cane sugar thrown off from the centrifugal machine is adapted to be delivered to the finishing department by means of the conveyor 43. Also connected to the centrifugal machine 42 by means of the pipe 44 is a tank 45, which is in turn adapted to be connected by means of the pipes 46 and 46—a to the storage tank 47 or if desired by means of the pipe 48 to the storage tank 49, which latter is connected by means of the pipe 50 to the vacuum pan 15. The storage tank 47 is connected by means of the pipe 51 to the vacuum pan 16 and by means of the pipe 52 to the char filter 53. The char filter 53 is adapted to be connected to the storage tank 54 by means of the pipe 55. The storage tank 54 is adapted to be connected by means of the pipe 56 to the vacuum pan 16.

The usual process of handling the granulated syrups of cane sugar refineries involves diluting and heating the same as they are slung off from the granulated sugar by centrifugal machines, and then either returning them to storage tanks on the pan floor to be taken back into the white sugar pans in boiling of further strikes of granulated sugar, or returning them to the char filtration apparatus for further decolorization and purification. In no case has it been the practice to extract further sugar from these granulated syrups as they are received directly from the centrifugals without first diluting and heating them as described above, and further extraction of high grade sugar is always done by boiling to grain in vacuum pans. The syrups before being reboiled may or may not be subjected to further char filtration, this depending upon their purity and color.

During the experimental work involved in the evolution of the process for the manufacture of extra fine soft granulated sucrose sugars as described in our copending application above referred to, either from cane or beet products of high purity and satisfactory characteristics as to density, color, etc., it was discovered that the granulated syrups, exclusive of the wash water, derived from centrifuging high purity hard granulated massecuites are particularly well adapted to the manufacture of such sugars as those described in the application mentioned above. In the first place, the syrups so derived range in purity between 80 and 99 per cent. and, secondly, they are of a density (78 to 82 per cent. solids by weight) most favorable for the maximum yields of the type of sugar we have described in the above mentioned copending application. Moreover, they are received at temperatures ranging usually between 140° F. and 170° F., the latter depending on the conditions under which the massecuite from which they are separated, is boiled. Finally, they are in a readily crystallizable state, and the fine grain which they contain may be melted out very easily either entirely or to an extent that those fine crystals which are allowed to remain will be of regular size and shape and do not interfere with the purging qualities of the massecuite to be obtained later in the process.

As stated above, such syrups as those just described were hitherto always sent back to the vacuum pans, either with or without further purification, to be boiled into further strikes of granulated sugar of the usual commercial types. Besides the additional steam required to reheat these syrups after dilution, and the steam required to later boil them into further strikes of sugar, the usual practices necessarily involve certain delays while the syrups are stored in the tanks preparatory to being reboiled into sugar, and the time required for reboiling into sugar in the vacuum pans. Furthermore, it has not hitherto been considered desirable from an economic standpoint to attempt the production of exceedingly fine grained soft sugars from high purity syrups of this type because of the difficulties attending the boiling of same in vacuum pans, the relatively small yields which can be obtained when attempting the boiling of sugar of this type at the temperatures necessarily employed when concentrating the contents of the pans even under the highest possible vacuums, and the difficulties which would necessarily be encountered when purging such massecuites in the centrifugals if the grain formation is not of such a character as to allow the latter operation to proceed satisfactorily.

We have found that by handling these syrups in a radically different manner, it is possible to obtain further yields of sugar from them without returning them, either with or without further char filtration, to the vacuum pans for reboiling; also, that the sugar obtained by the present process is of extremely fine, soft texture (differing in this respect from the finest grade of extra fine granulated sugar being produced by existing methods) and that sugar of this character is thereby produced without the difficulties which would attend attempts to produce same by the vacuum pan process. Furthermore, the size of the grain of the sugar so produced may be regulated within certain limits, and that large yields are possible.

The process of securing even settings of normal crystals by inducing crystallization by rapidly cooling the requisite number of degrees for the production of purgable massecuites, is employed in the present process. This process of securing satisfactory grain settings has been described fully in our copending application above referred to. In order that purgable massecuites should be produced, the following conditions are necessary: (1) If false grain of various sizes and shapes are present in the syrup, the syrup must be heated sufficiently to remove the very fine crystals, termed "smear" by practical operators, which may be present in sufficient quantity to interfere with the purging qualities of the massecuites to be produced. This "smear" is more pronounced in granulated syrups from granulated sugar strikes which have not been properly boiled or which have cooled slowly in the mixer. (2) Sufficiently small crystals of even size must be induced by cooling of the supersaturated syrup rapidly to a point where a satisfactory grain (crystal) setting has been obtained. The idea is to obtain sufficient grain to allow improvement of the crystals so formed by contact with the mother liquor, yet they must be sufficient in number to prevent the formation of subsequent crops of crystals, termed "false grain". (3) The crystals so formed must be improved by keeping the mass in continuous slow agitation in order to keep the induced crystals (and seed crystals if the latter are used) in suspension and evenly distributed throughout the solution.

In regard to the first condition mentioned above, it may be readily understood that the presence of grain in the syrups is something which must always be expected, in that these syrups are obtained from purging of hard granulated sugar massecuites. The amount and type of grain as to crystal characteristics will necessarily depend upon the purity, density, and temperature of the original massecuite from which these syrups are derived, and the regularity of the crystals present in the original massecuite. While in many instances, especially when working with high purity syrups from the highest purity massecuites, it will be found possible to proceed directly with the cooling process because of the regularity and the number of crystals which will already be present; in most cases, especially when working syrups of lower purity derived from granulated massecuites of lower purity, it will be found advisable to melt the greater part of the crystals originally present and then induce a new crop or setting by rapidly cooling below the saturation point, either with or without the use of seed crystals.

The second condition which must be met; i. e., that of inducing satisfactory grain settings, has been discussed in detail in our copending application above referred to. Briefly stated, when the syrups are delivered to the cooling apparatus at temperatures ranging between 140° and 180° F., there being no particular reason for employing higher temperatures when working syrups of this type, the cooling temperature for inducing satisfactory grain settings may range between 95° and 130° F., this depending upon the density and purity of the syrup being treated, and the size of crystals desired in the finished product. In general, satisfactory settings may be obtained with relatively smaller temperature drops when high purity syrups are being treated because of the extreme rapidity and ease with which crystallization may be induced in syrups of this type. Larger grained sugars are made by employing smaller temperature drops, and smaller grained sugars are made by the use of greater temperature drops.

The third condition mentioned above is that of keeping the crystallizing mass in constant slow agitation until the crystals have grown to the desired size, and the mother liquor has been exhausted to the lowest possible point which is still consistent with economical practice and without detrimentally affecting the character of the crystals. If the crystallization is induced, and the mass is then not kept in a homogeneous condition, false grain may form in the layer of syrup above the crystals which have settled, with the result that the purging qualities of the massecuite so formed will be impaired. The time of contact between the mother liquor and the crystals varies between one half and six hours, or possibly longer provided ample crystallizer capacity is available, and it is found that longer periods are advantageous.

In the preferred practice of our process the syrup from the centrifugals 20, which is derived by purging the massecuite which has been boiled in the vacuum pan 15 from high purity char filtered liquors from the char filters 10, is separated from the wash water used on the centrifugals by means of a tilting device herein not shown. By this means the heavy syrup containing from 78 to 82 per cent. solids by weight is collected separately and flows through a pipe or trough to the receiving tank 21. This syrup as delivered to the receiving tank usually ranges in temperature between 140° F. and 165° F. It is then drawn off to the pump 24 which forces the syrup through the pipe 25 to the heater 26, or by proper manipulation of valves may be by-passed from the heater and delivered either to the small equalizing tank 27 or directly to the cooling apparatus 30. In most cases it is advisable to use the heater 26 and raise the temperature of the syrup to from 150° to 180° F. to melt fine grain which is already present in the hot syrup. The cooling apparatus 30 may be of any suitable design capable of effecting the immediate cooling to the temperature at which satisfactory grain (crystal) settings are obtained in syrups of different purities and densities, but for best results we prefer the cooling apparatus of the design above described as this cooler is capable of very close regulation and the instantaneous cooling action it produces will usually induce crystallization in the desired manner when working with syrups and liquors within the limits of density and purity previously described and specified. The hot syrup is discharged through the pipe 29 on the scatter-plate 32 of the centrifugal basket 31. This centrifugal basket is revolving at a high rate of speed and the centrifugal force generated throws the syrup against the inside walls of the basket where it is finely atomized when passing through the perforations in the side of the basket, and is finally thrown out against the side of the cooling jacket 33 which is cooled by circulating cool water. A current of cool air may be drawn upwards through the cooling chamber by means of an exhaust fan 34 located at the top of the hood 35. The syrup thus projected against the walls of the cooler is rapidly cooled to the required temperature, this being controlled by the rate at which the hot liquor is run into the cooler, and crystallization is induced very rapidly. The crystallizing syrup runs down the cooling jacket and out of the openings 36 at the bottom of the apparatus, and falls into the trough 37 and is then conveyed to the crystallizer 38 which is equipped with the agitator 39 and the water jacket 40. The crystallizing mass is kept in slow motion and is maintained at a temperature most favorable for the maximum yields of sugar having the desired crystal characteristics. After from one half to six hours, or longer if such is found desirable, in the crystallizer 38, the massecuite is discharged into the mixer 41 and from thence into the centrifugal machine 42, where the mother liquor is thrown off and the cleanly purged crystals are washed with water until they have acquired the desired purity and whiteness. The mother liquor is run off through pipe 44 and the washed crystals are discharged from the centrifugals, and conveyed to the finishing department where they are dried, screened, and packed in the usual manner. The operations incidental to the finishing process are not claimed as part of the present process.

With reference to the disposal of the mother liquors just mentioned above, they are collected in the receiving tank 45 and pumped through the pipe 46 to the storage tanks 47 or 49. From here, it may be taken into the pan 15 and boiled into a strike of granulated sugar of the usual type, and disposed of in the usual manner, or may be sent to the char filter 53 for further purification and then discharged into the storage tank 54 or it may be drawn into the vacuum pan 16 and reconcentrated under vacuum to approximately 80 per cent. solids by weight, and then discharged into the receiving tank through pipe 22 and used in the production of further batches of extra fine soft granulated sugars by the present process. The disposal of such syrups depends upon their purity and color, and the production demands for the hard and soft granulated sugars both being produced in the same refinery; and may be varied at the discretion of the operator. In case these mother liquors are char filtered before being again entered into the later operations of the process, after leaving char filter 53 they are discharged into storage tank 54 and from thence are drawn into the vacuum pan 16 and either boiled into a strike of hard granulated sugar and discharged through pipe 18 into the mixer above the centrifugals 20, or may be concentrated to 80 per cent. solids and discharged at a temperature of 165 to 175° F. and in a substantially grain-free condition through pipe 22 into the receiving tank 21.

If production demands for the extra fine soft granulated sugars manufactured by the present process become so large that the supply of granulated syrups and mother liquors of suitable purity from the various white sugar strikes becomes inadequate, high grade char filtered liquors from the filter 10 may be drawn from the storage tank 12 through the pipe 14, and delivered to the vacuum pan 16 to be concentrated and discharged into receiving tank 21 in the manner described above.

Although the accompanying drawing illustrates only one each of the different filters, vacuum pans, coolers, etc., it is to be understood that we may employ batteries or sets of each apparatus in actual factory installations, this depending upon individual requirements.

Specifically, the temperature range employed in the various operations which are a part of our process is essentially the same as described in our copending application. The syrups are obtained from the centrifugal machines or vacuum pans at temperatures ranging between 140° and 165° F. under most conditions, although this may vary without affecting the ultimate results. These syrups are in a supersaturated condition at these temperatures, and range in purity between 80 and 99.9 per cent. in most cases. Their density, when wash water is separated at the centrifugals, ranges between 78 and 82 per cent. solids (78 to 82 Brix at 17.5° C.). When it is required that these syrups be passed through the heater 26 they are usually raised to temperatures ranging between 150° and 180° F. or even higher, depending on conditions previously mentioned, and when discharged from the cooler 30 they range in temperature between 95° and 130° F., although this may be varied on either side of these limits at the discretion of the operator, and depending on the type of grain desired, and the purity and density of the syrup being treated. Smaller temperature drops are necessary to induce satisfactory crystallization in the cooler when treating high purity syrups, and relatively greater ones when the lower purity syrups are treated. In the latter case it is often advantageous to "seed" the hot liquor or syrup just before it is pumped into the cooling apparatus, and either dry seed from a previous batch may be used or magma having crystals of uniform characteristics may be employed. The use of relatively large amounts of seed (1 to 10 per cent. by volume) in the form of a magma is preferred when working syrups of the lower purity range (80 to 95 purity) in order to induce grain of satisfactory characteristics and eliminate the possibility of difficulties due to impurities, variations in density, etc., which appear to affect the results more when working with lower purity syrups than when syrups and liquors of the higher purity range (95 to 100 per cent.) are being treated. The crystallizing mass is discharged into the crystallizer 38 at temperatures ranging between 95° and 130° F. under most conditions, and by circulating cooling water in the jacket of the crystallizer the temperature may be reduced and maintained at temperatures ranging between 90° and 100° F., and after satisfactory crystal growth and formation is assured the temperature may be further reduced in order to decrease the temperature as far below saturation as possible and increase yields without adversely affecting the quality of the crystals.

By this process, additional sugar of very desirable characteristics is produced before the syrups are returned to the vacuum tanks for reboiling. The syrup to be returned, therefore, is approximately only one-half of the quantity which is directly returned from the high purity hard granulated strikes when the present process is not employed. Ordinarily, the refinery must adjust their boiling schedules and cycles so as to provide facilities for the reboiling of the granulated syrups so obtained until they have dropped in purity sufficiently to require further purification by additional char filtration, or until they are sent to the remelt house to be boiled into remelt sugars. However, it is easily appreciated that if further crystallization of sugar is obtained by the present process before the syrups are returned for reboiling in vacuum pans, the latter may be used in boiling a larger proportion of high grade liquors owing to the decreased amount of granulated syrups returned, and at the same time the production of an extra fine grade of high grade sugar is made possible through employment of the new process described herein without the consumption of further steam used in reboiling. Regardless of the boiling schedules employed, the pans will be free to boil larger proportions of high grade liquors and the capacity of the refinery is thereby increased when sugar is produced by crystallization processes not requiring the use of vacuum pans.

It is known that slight variations and readjustments of the schedules for handling the various syrups and liquors will be necessary in different factories, this depending upon the relative amounts of each type of sugar which must be produced in order to meet production demands, and upon the various operating conditions which are peculiar to each factory. It is readily appreciated, however, that such variations and adjustments do not constitute departures from the principles and spirit of the invention which we have described.

By the use of the term "normal" crystals is meant crystals of regular size and shape which will satisfactorily purge in the factory centrifugals. Terms such as "strike", massecuite", and "magma" are variously used to designate the mass of crystals surrounded by mother liquor which are discharged from vacuum pans and crystallizers in a state suitable for purging in the factory centrifugals. Of course, there are unpurgable strikes, massecuites, or magmas, also, due to the irregularity in crystal formation and growth; but this is a condition which can be prevented in practically every instance by the worker who is skilled in the art.

It is to be understood that while we have described the preferred practice of our process and form of apparatus by which it may be carried out, the details of procedure of the process and the form of apparatus described may be widely varied without departing from the spirit of the invention or the scope of the subjoined claims.

We claim:

1. The process of producing extra fine, soft, granulated cane sugar from the syrups derived from the centrifugal machines during the purging of high grade strikes of hard granulated cane sugar which comprises rapidly cooling said syrup to induce a substantially instantaneous and substantially complete and regular grain setting, maintaining said syrup at a crystallizing temperature, and separating the crystals formed from the mother liquor.

2. The process of producing extra fine, soft, granulated cane sugar from the syrups derived from the centrifugal machines during the purging of high grade strikes of hard granulated cane sugar which comprises heating said syrup to concentrate the same, rapidly cooling said syrup to induce a substantially instantaneous and substantially complete and regular grain setting, maintaining said syrup at a crystallizing temperature, and separating the crystals formed from the mother liquor.

3. The process of producing extra fine, soft, granulated cane sugar from the syrups derived from the centrifugal machines during the purging of high grade strikes of hard granulated cane sugar which comprises concentrating said syrup to a density of approximately from 78 to 82 per cent. solids by weight, removing any crystals present, rapidly cooling said syrup to induce substantially complete and regular grain setting, maintaining said syrup at a crystallizing temperature, and separating the crystals formed from the mother liquor.

4. The process of producing extra fine, soft, granulated cane sugar from the syrups derived from the centrifugal machines during the purging of high grade strikes of hard granulated cane sugar which comprises concentrating said syrup to produce a supersaturated sucrose solution, rapidly cooling said syrup to induce a substantially instantaneous and substantially complete and regular grain setting, maintaining said solution at a crystallizing temperature, and separating the crystals formed from the mother liquor.

5. The process of producing extra fine, soft, granulated cane sugar from the syrups derived from the centrifugal machines during the purging of high grade strikes of hard granulated cane sugar which comprises separating the granulated syrup from the wash water, heating said syrup to remove any crystals present, rapidly cooling said syrup to induce substantially complete and regular grain setting, maintaining said syrup at a crystallizing temperature, and separating the crystals formed from the mother liquor.

6. The process of producing extra fine, soft, granulated cane sugar from the syrups derived from the centrifugal machines during the purging of high grade strikes of hard granulated cane sugar which comprises separating the syrup from the wash water, heating said syrup from 140 to 180° F., rapidly cooling said syrup to induce substantially complete and regular grain setting, maintaining said syrup at a crystallizing temperature and separating the crystals formed from the mother liquor.

7. The process of producing extra fine, soft, granulated cane sugar from the syrups derived from the centrifugal machines during the purging of high grade strikes of hard granulated cane sugar which comprises separating the syrup from the wash water, heating said syrup to concentrate the same, rapidly cooling said syrup to from 95 to 135° F., to induce a substantially instantaneous and substantially complete and regular grain setting, maintaining said syrup at a crystallizing temperature, and separating the crystals formed from the mother liquor.

8. The process of producing extra fine, soft, graulated cane sugar from the syrups derived from the centrifugal machines during the purging of high grade strikes of hard granulated cane sugar which comprises heating said syrup, maintaining the temperature of said syrup to concentrate the same, rapidly cooling said syrup to from 95 to 130° F., maintaining said syrup at from 90 to 100° F., and separating the crystals formed from the mother liquor.

9. The process of producing extra fine, soft, granulated cane sugar from the syrups derived from the centrifugal machines during the purging of high grade strikes of hard granulated cane sugar which comprises concentrating said syrup to approximately 80 per cent. solids, rapidly cooling said syrup to induce substantially complete and regular grain setting, maintaining said syrup at a crystallizing temperature, agitating said syrup at such temperature and separating the crystals formed from the mother liquor.

10. The process of producing extra fine, soft, granulated cane sugar from the syrups derived from the centrifugal machines during the purging of high grade strikes of hard granulated cane sugar which comprises separating the granulated syrup from the wash water, heating said syrup to concentrate the same, introducing a seeding magma into said syrup, rapidly cooling said syrup to induce a substantially instantaneous and substantially complete and regular grain setting, maintaining said syrup at a crystallizing temperature, and separating the crystals formed from the mother liquor.

11. The process of producing extra fine, soft, granulated cane sugar from the syrups derived from the centrifugal machines during the purging of high grade strikes of hard granulated cane sugar which comprises heating said syrup to concentrate the same to a density of approximately 78 to 82 per cent. solids by weight, rapidly cooling said syrup to induce a substantially instantaneous and substantially complete and regular grain setting, maintaining said syrup at a crystallizing temperature, agitating said syrup at said temperature, and separating the crystals formed from the mother liquor.

12. The process of producing extra fine, soft, granulated cane sugar from the syrups derived from the centrifugal machines during the purging of high grade strikes of hard granulated cane sugar which comprises separating the syrup from the wash water, removing any crystals present, concentrating said syrup to a density of approximately 78 to 82 per cent. solids by weight, rapidly cooling said syrup to induce a substantially instantaneous and substantially complete and regular grain setting, maintaining said syrup at a crystallizing temperature, slowly agitating said syrup at said temperature, and separating the crystals formed from the mother liquor.

13. The process of producing extra fine, soft, granulated cane sugar from the syrups derived from the centrifugal machines during the purging of high grade strikes of hard granulated cane sugar which comprises separating the syrup from the wash water, heating said syrup to from 140 to 180° F., concentrating said syrup to a density of approximately 80 per cent. solids by weight, rapidly cooling said syrup to from 95 to 130° F., maintaining said syrup at from 90 to 100° F., agitating said syrup at such temperature, and separating the crystals formed from the mother liquor.

In testimony whereof we affix our signatures.

BERNARD H. VARNAU.
TRUMAN B. WAYNE.